Jan. 31, 1961

E. CERIAT 2,969,836

APPARATUS FOR FORMING TUBULAR CONDUITS
FROM FIBROUS MATERIAL

Filed Nov. 20, 1958

Inventor
Eugene Ceriat,
by John H. Leonard
Attorney.

Jan. 31, 1961　　　　　E. CERIAT　　　　　2,969,836
APPARATUS FOR FORMING TUBULAR CONDUITS
FROM FIBROUS MATERIAL
Filed Nov. 20, 1958　　　　　　　　　　　6 Sheets-Sheet 2

Inventor
Eugene Ceriat,
By
John A. Leonard,
his Attorney.

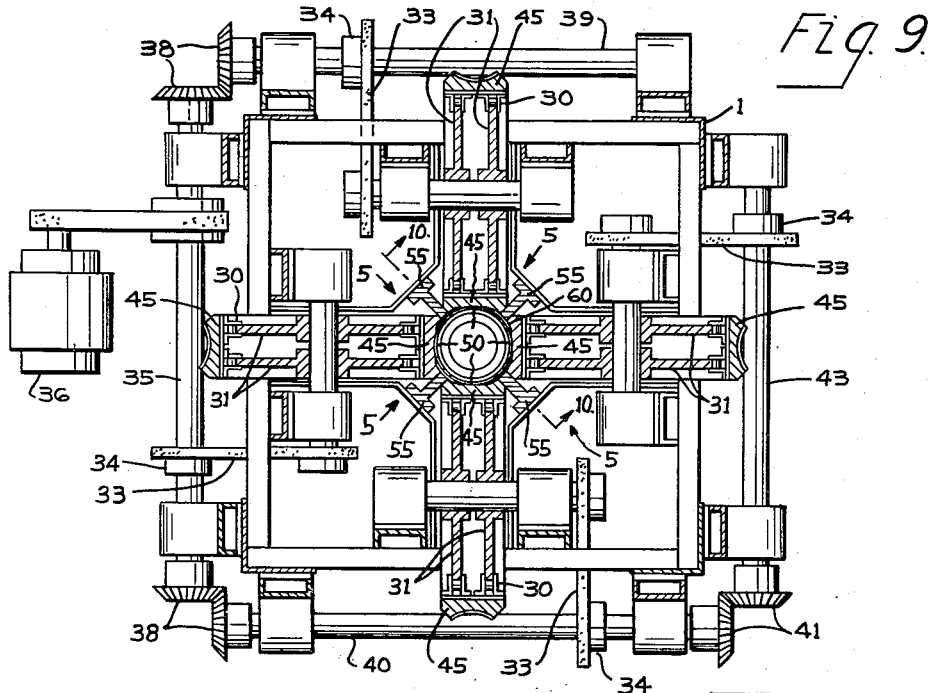
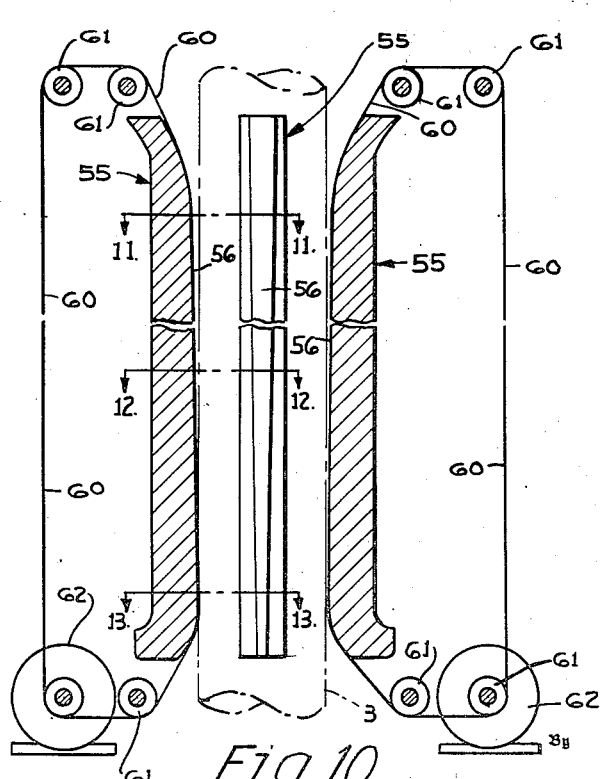
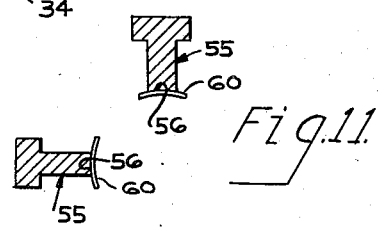
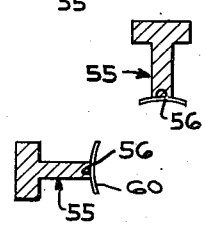
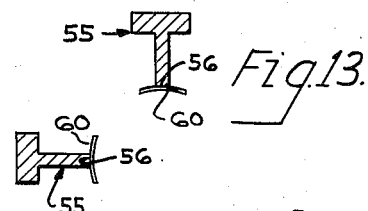

Jan. 31, 1961  E. CERIAT  2,969,836
APPARATUS FOR FORMING TUBULAR CONDUITS
FROM FIBROUS MATERIAL
Filed Nov. 20, 1958 6 Sheets-Sheet 5

Eugene Ceriat, Inventor

By John H. Leonard, his Attorney.

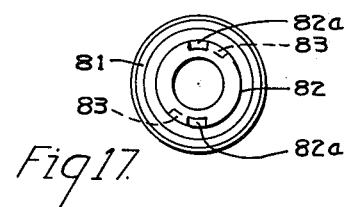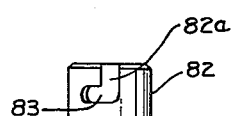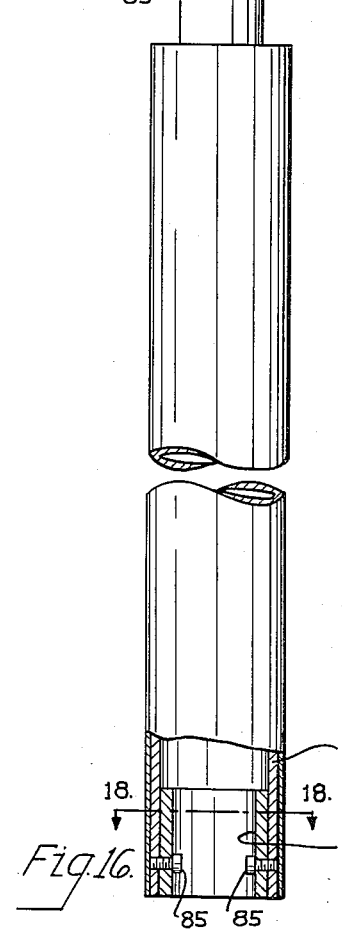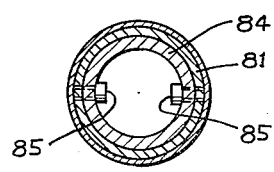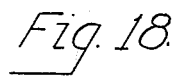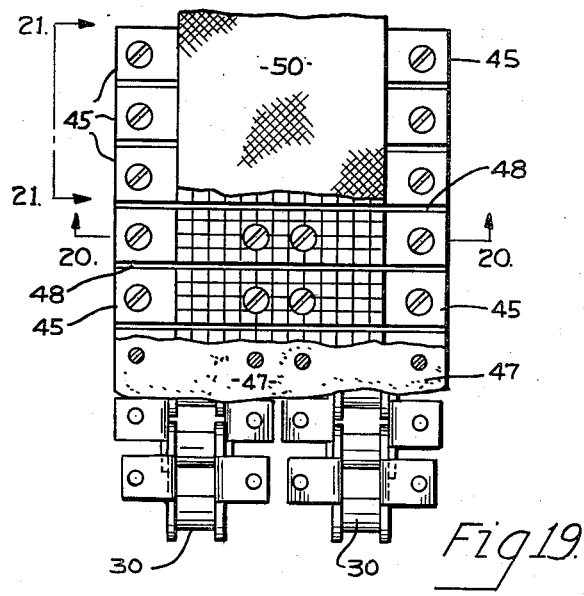

United States Patent Office 2,969,836
Patented Jan. 31, 1961

2,969,836
APPARATUS FOR FORMING TUBULAR CONDUITS FROM FIBROUS MATERIAL

Eugene Ceriat, Los Angeles, Calif., assignor to American Vitrified Products Company, Cleveland, Ohio, a corporation of New Jersey Filed Nov. 20, 1958, Ser. No. 775,314

6 Claims. (Cl. 162—295)

This invention relates to an apparatus for molding tubular conduits of fibrous material, and particularly to a continuous method of producing tubular conduit from a slush of fibrous material.

For purposes of illustration, the invention is described herein as applied to the production of asbestos pipe from a conventional slush of asbestos fibers, with or without other fibers and ingredients, its application to the production of pipes from other fibrous materials being readily apparent from the illustrative example.

Heretofore, asbestos pipes have been manufactured by relatively conventional molding processes in which individual molds are filled with a slush of asbestos fiber and allowed to drain, whereupon, after a time delay, the pipe is removed from the slush and set aside for drying and curing.

Attempts have been made to extrude pipe of this character, but such have not proven satisfactory.

One of the principal objects of the present invention is to provide a new apparatus for producing pipe, either as a continuous or semi-continuous operation, from the slush of asbestos fiber, in a manner such that the finished pipe is of uniform high quality, both as to density and contour.

Another object is to provide a simplified apparatus which produces such pipe more rapidly and at less cost than is required by the prior machines and processes.

Various other objects and advantages will become apparent from the following description wherein reference is made to drawings illustrating a preferred embodiment of the invention, and wherein:

Fig. 1 is a side elevation of an apparatus embodying the principles of the present invention, part thereof being shown in section;

Figs. 2, 3, and 4 are a fragmentary top plan view, side elevation, and front elevation, respectively, of a travelling mandrel guide and support of the present apparatus;

Fig. 9 is an enlarged horizontal sectional view taken on the line 9—9 of Fig. 1;

Fig. 10 is a fragmentary vertical sectional view of the molding mechanism of the present invention, taken on the line 10—10 of Fig. 9, and showing the molding guides and a fragment of the mandrel, part of the mechanism being omitted for clearness in illustration;

Figure 1:
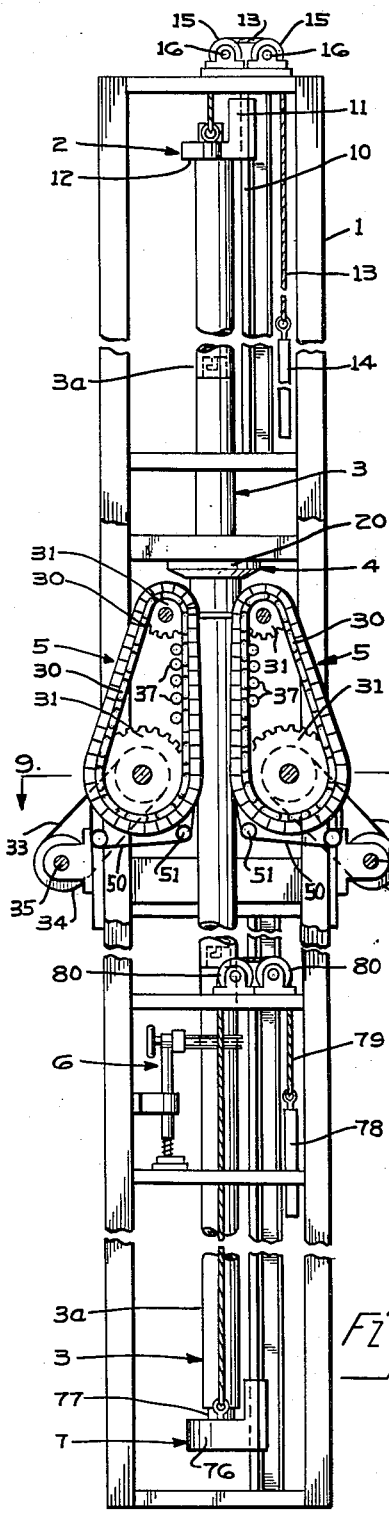
Figure 2:
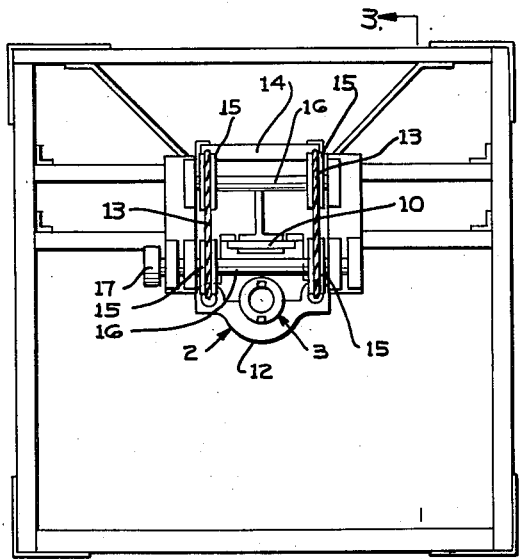
Figure 3:
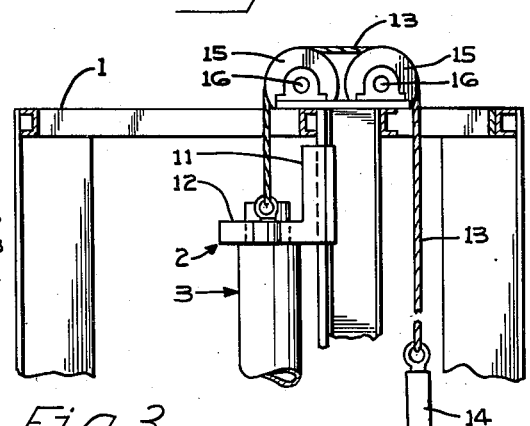
Figure 4:
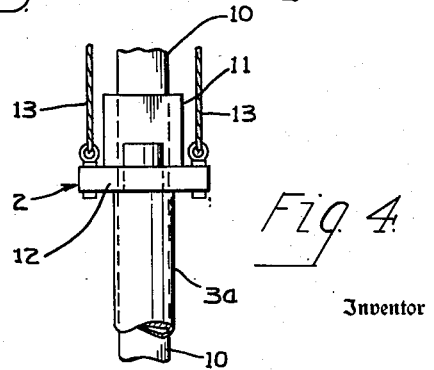
Figure 5:
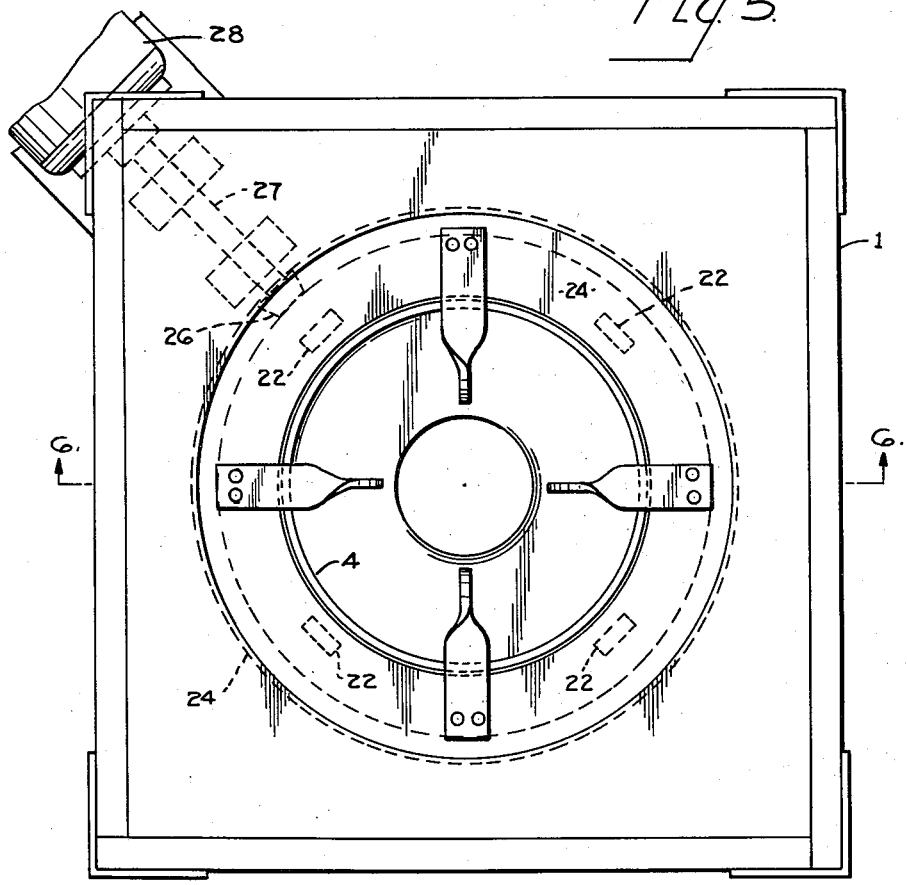
Fig. 5 is a top plan view of a feed hopper and agitator forming part of the apparatus.
Figure 6:
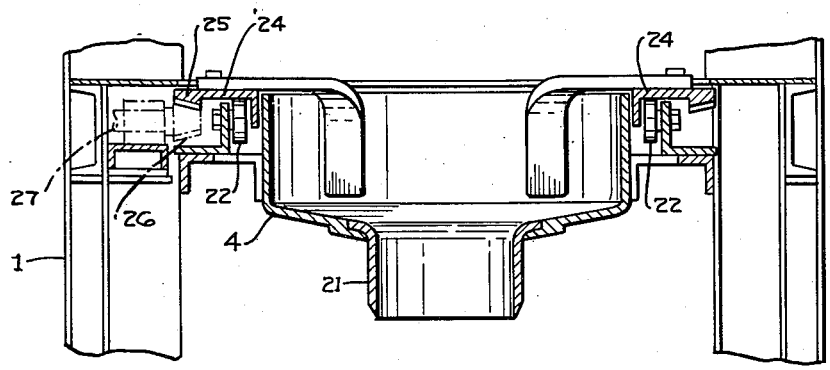
Fig. 6 is a vertical fragmentary sectional view taken on the line 6—6 of Fig. 5.
Figure 7:
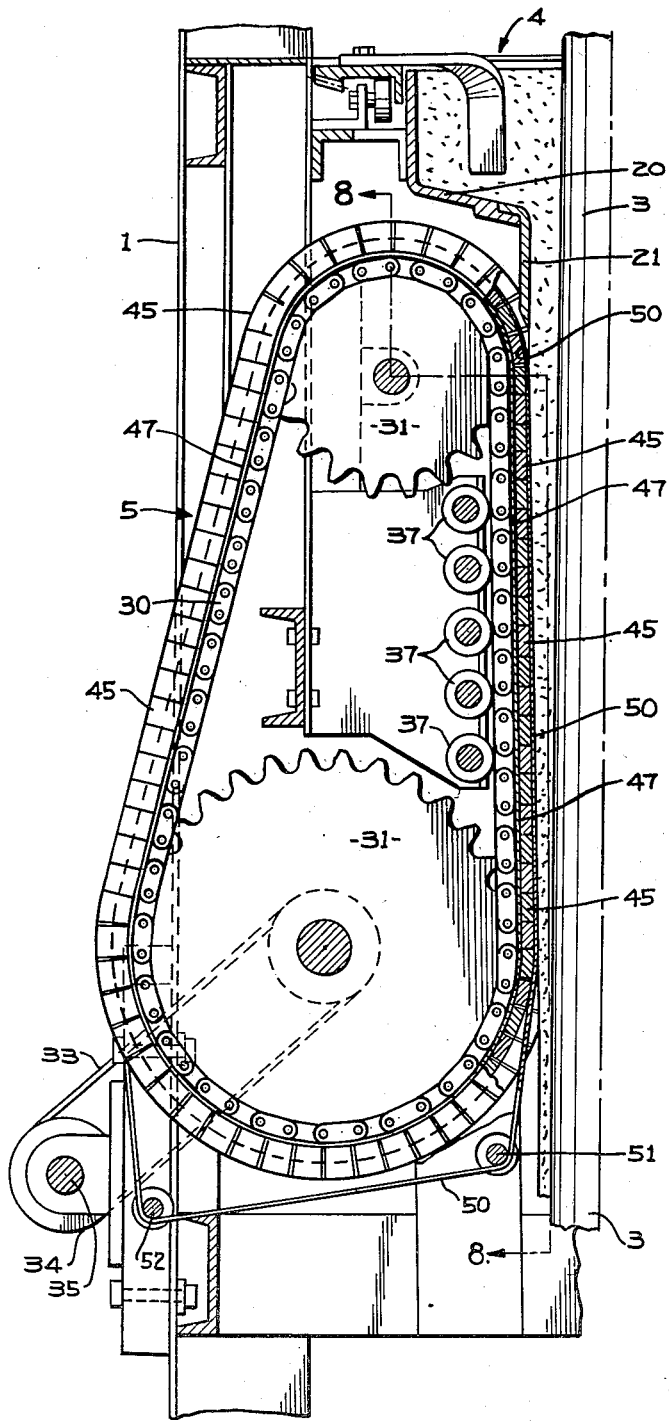
Fig. 7 is an enlarged fragmentary side elevation of part of the molding mechanism of the present apparatus, part thereof being shown in section.
Figure 8:
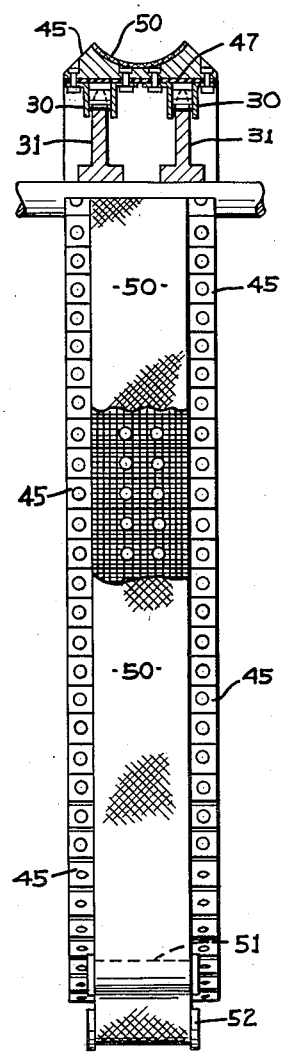
Fig. 8 is a fragmentary vertical sectional view taken on the line 8—8 of Fig. 7.
Figure 14:
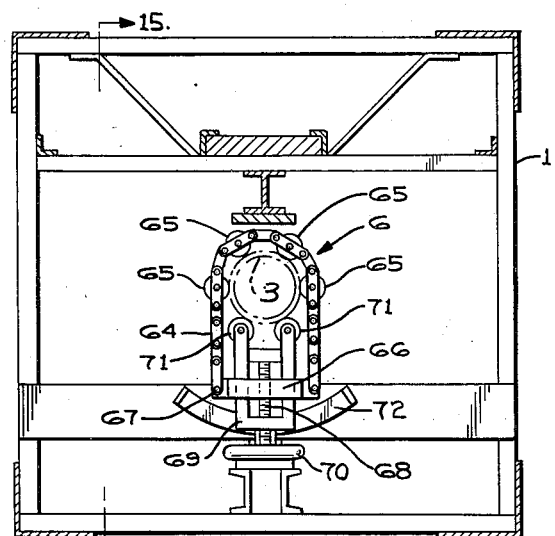
Figure 15:
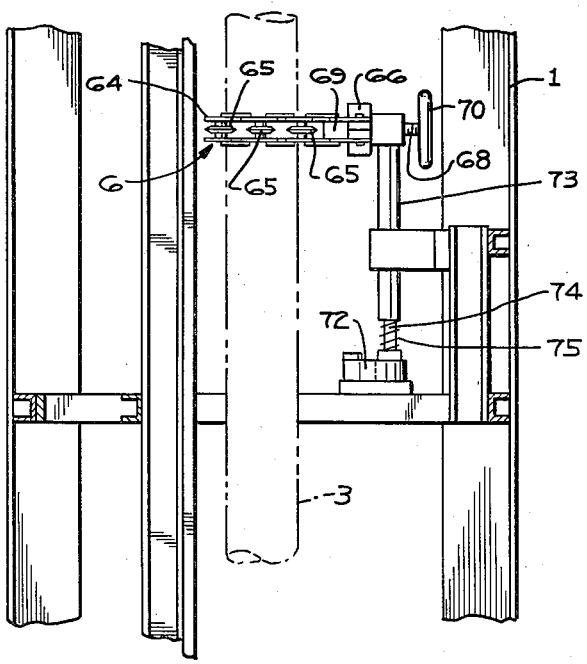

Figs. 11, 12, and 13 are fragmentary horizontal sectional views, respectively, of some of the molding spacers and belts, and are taken on the lines 11—11, 12—12, and 13—13, respectively, of Fig. 10;

Fig. 14 is an enlarged plan view of a cutter of the present invention, part of the adjacent apparatus being shown in section;

Fig. 15 is a fragmentary vertical sectional view taken on the line 15—15 of Fig. 14;

Figs. 16 and 17 are an enlarged side elevation, partly in section, and an enlarged top end view, respectively, of the mandrel of the present invention;

Fig. 18 is a horizontal sectional view taken on the line 18—18 in Fig. 16;

Fig. 19 is an enlarged fragmentary front elevation of the endless conveyor chain of the molding mechanism of the present invention, part thereof being shown in section;

Fig. 20 is a horizontal sectional view taken on the line 20—20 of Fig. 19; and

Fig. 21 is a fragmentary side elevation, partly in section, as viewed from line 21—21 in Fig. 19.

The present apparatus is one by which the slush of fibrous material which is to be molded into a pipe is fed downwardly by gravity into the upper end of a molding throat formed by continuously downwardly moving molding surfaces which are arranged side by side in a row extending circumferentially of the throat axis and which converge radially toward the throat axis in a direction downwardly from their upper to their lower limits.

A cooperating sectional mandrel is arranged to move downwardly axially through the throat in radially spaced relation to the molding surfaces and at substantially the same speed as the molding surfaces.

The slush is fed into the space between the mandrel and the molds at the upper end of the throat and, due to the downward convergence of the molding surfaces, the slush is compressed gradually progressively as it travels from the entry end at the top of the throat to the discharge end at the bottom of the throat. The compressed and formed fibrous material issues from the throat in the form of a pipe with the mandrel encased therein. The pipe is severed circumferentially and is removed with a section of the mandrel therein. Subsequently, the mandrel section is removed and returned to starting position for reuse by connecting it to the upper end of a mandrel section which is being fed through the throat.

The apparatus comprises generally a frame 1, at the upper end of which is a suitable mandrel support and guide 2 which supports a sectional mandrel 3, comprised of coaxial lengths or sections 3a, detachably connected together in end to end relation, in coaxial relation to the outlet of a feed hopper 4 from the lower end of which the slush of fibrous material is fed into the molding mechanism indicated generally at 5. In the molding mechanism 5, the slush is formed into a pipe about the mandrel sections 3a, and the pipe and mandrel sections issue from the lower end of the mechanism 5, and pass to a location wherein a flying cutter 6 is provided to cut the formed material during travel of the formed pipe and mandrel downwardly. Upon cutting the pipe, the cutoff portion of the pipe with the mandrel section therein, is removed, the lower section of the mandrel being supported by a suitable guide and support 7 during its downward travel and during disconnection of the lower mandrel section from the section immediately above it.

Referring specifically to the various parts of the apparatus above referred to, the upper guide and support 2 comprises an upright guideway 10 on which is slidably mounted a carriage 11 having a clamp 12 which is arranged to be clamped firmly into engagement with the upper end of a section 3a of the mandrel 3. The guide and support 2 supports the mandrel in upright position in coaxial relation with the molding throat for axial movement downwardly. The carriage 11 is connected by suitable cables 13 to a counterweight 14 which counterbalance a large portion of the weight of the mandrel but are of sufficient weight to prevent the lowering of the carriage by gravity when a section 3a of the mandrel 3 is suspended from the carriage. The cables 13 pass over sheaves 15 which have a shaft 16 connected with a suitable brake 17. The sheaves have rough surfaces for affording adequate frictional resistance to the cable to prevent slippage of the cable around the sheaves. As a result, the rate of lowering of the carriage 11 and sections 3a of the mandrel by gravity can be controlled by the brake 17. When the clamp 12 is disconnected from the mandrel section 3a, the counterweight 14 can lift the carriage 11 to its starting position.

Below the top or starting position of the carriage a distance slightly greater than the length of a mandrel section 3a, is a feed mechanism. The feed mechanism comprises a hopper 20 which is open at the top for the reception of the slush of material to be molded. The hopper 20 is mounted in fixed position on the frame and has a discharge spout 21 which is coaxial with the mandrel 3 and throat and is of slightly greater diameter than the outside diameter of the pipe to be formed. The mandrel 3 extends downwardly through the hopper 20 and spout 21 and is held in coaxial relation therewith and in spaced relation to the peripheral wall thereof by means of the carriage 11. The spout discharges downwardly continuously into the space between the external walls of the mandrel and the molding surfaces of the throat.

Mounted on suitable rollers 22 on the frame, for rotation about the throat axis relative to the hopper 20, is an annular plate 24 having at its outer periphery a coaxial gear ring 25 which is rotatable therewith and which is driven by means of a gear 26. The gear 26, in turn, is driven by a power driven shaft 27 which may be driven by a suitable means such as a motor 28. Suitable agitating fingers are mounted on the plate 24 and extend into the interior of the hopper and operate, upon rotation of the plate, to agitate and stir the slush and maintain it in good condition for feeding and molding. The central opening of the annular plate 24 permits charging the hopper with the slush to be fed to the throat.

Referring next to the molding apparatus, in the form illustrated the apparatus comprises a plurality of devices 5 arranged in laterally spaced relation to each other about the axis of the throat or pipe to be formed and having operating surfaces, respectively, which define the outer mold surface of the pipe, and thus the molding throat. The operating surfaces are so arranged that the throat is wider than the pipe to be formed at the upper end, and they are gradually convergent toward the lower or discharge end of the throat.

Since all of the devices 5 are the same, only one is described in detail.

Each of the devices 5, in the form illustrated, comprises an endless conveyor in the form of a pair of endless chains 30, each of which passes over sets of sprockets 31. The sprockets 31 are driven, through a suitable flexible connection 33, such as a chain or belt, by a driving sprocket or pulley 34, the sprocket 34, in turn, being mounted on a driven shaft 35 which is rotatably driven by a suitable motor 36 through the medium of a belt or chain. Back-up rolls 37 are arranged along the chains so that the chains move in lineal paths at the pipe molding zone.

In the form illustrated, four of the molding devices 5 are provided and they are arranged in circumferentially spaced relation to each other about the axis of the pipe to be formed. Since all are to be driven at the same speed and in fixed relation to each other, suitable driving mechanism, as best illustrated in Fig. 9, is provided. In this form, the main driving shaft 35 is drivingly connected at its ends by suitable bevel gears 38 to drive shafts 39 and 40 which, in turn, by virtue of bevel gears 41, are drivingly connected to a drive shaft 43. Each of the shafts 39, 40, and 43 is drivingly connected to an associated one of the devices 5 in the same manner as heretofore described, so that all of the devices 5 operate at the same speed.

Mounted on the conveyor chains 30 of each device, as best illustrated in Figs. 19 and 20, are tread shoes 44 which have outer curvilinear surfaces, as indicated at 45, which face outwardly from the chain and, at one side of the plane defined by the axes of the sprockets 31, face toward the forming throat. The surfaces 45 are curvilinear and are slightly larger in diameter than the outer diameter of the finished pipe. For purposes to be described more fully hereinafter, these surfaces are provided with drainage grooves 46 and a rubber belt 47 is interposed between the bases of the shoes 44 and the chain 30 so as to prevent water and the like from dripping and squirting onto the chains.

The chains are preferably stainless steel or of material which is not adversely effected by the water or chemicals that may be contained therein. The shoes 44 are arranged in edge to edge spaced relation in a row with the axis of the curvilinear surfaces 45 extending endwise of the row. The shoes are spaced a short distance apart from each other, as indicated at 48 so that water entering the grooves 46 can drain to the ends of the grooves and be discharged through the spaces 48 between adjacent shoes.

Each device 5 is arranged so that the surface defined by those of the surfaces 45 facing toward the throat slopes inwardly toward the axis of the throat in a direction from the upper end of the throat to the lower end of the throat so that, as a result, the throat formed by the group of devices 5 is one which is gradually contracted from its upper or feeding end to its lower or discharge end.

Overlying the faces 45 of the shoes at the throat side of the devices 5 is a flexible, pourous, belt 50 which preferably is in the form of a wire mesh, or nylon cloth of open mesh, with a mat of nylon or Dacron therebetween. In any event the belt is porous and permits water to pass readily therethrough, and also is flexible so that it may conform to the transverse curvilinear contour of the faces 45 of the shoes 44, and bridging across the small channels 46.

The belt 50 passes around suitable pulleys 51 and 52, the pulley 52 being arranged to apply a slight downward pull on the belt to maintain it relatively taut so that the belt at the throat side of the row of shoes 44, conforms transversely to the contour of the faces 45 of the shoes, and thereby forms a continuous inverted frusto-conical surface from an upper location at which the material is fed into the throat by the hopper downwardly to the discharge end of the throat.

Thus, with the mandrel held firmly in coaxial relation to the throat, the material fed into the space between the mandrel 3 and the belt 50 by the spout 21 is gradually compressed as it moves downwardly with the belt and mandrel, and thus is compressed and formed into a pipe, the water expelled from the slush during the compression thereof passing through the belt 50 into the grooves 46 and discharging through the spaces between the shoes 44. The belt 50 is driven by its frictional engagement with the surfaces 45.

Necessarily, since the shoes are arranged so that the rows thereof converge, in a downwardly direction, toward the axis of the throat, and the shoes are necessarily fixed in dimension circumferentially of the throat, they are spaced apart from each other circumferentially of the throat at the upper end of the throat as they pass the spout 21, and for substantially the full length of the throat. Thus, circumferentially of the axis of the throat, the lateral edges of the shoes are spaced apart from each other a distance which is gradually decrescent downwardly.

Accordingly, in order to present a more nearly continuous outer molding surface, suitable spacers 55 are mounted on the frame and extend into the spaces between adjacent rows of shoes 44. The spacers 55 have operating surfaces 56 which taper circumferentially of the throat in a downwardly direction so that they bridge the space between adjacent shoes at all times, respectively. At the same time, their operating surfaces slope inwardly toward the throat axis so as to converge along with the surfaces 45 of the shoes as they approach the lower or discharge end of the throat. Thus the surfaces 45 of the shoes and the surfaces 56 of the spacers form approximately a cylindrical outer molding wall which becomes truly cylindrical at the discharge end of the throat and then again expands.

However, since the surfaces 56 do not travel with the belt 50 and mandrel, frictional drag can develop between the surfaces 56 and the slush to be molded. To eliminate this drag, small porous belts 60 are arranged to move along the surfaces 56 downwardly. The belts 50 and 60 overlap at their margins. The belts 60 pass around suitable pulleys 61, at least one of which is driven by a suitable motor 62, or other means, so that the belts 60 are driven at a rate such that their surfaces, exposed toward the throat axis, travel at the same rate as the belt 50 from the upper to the lower end of the guides. Preferably, the belts 60 lie against, and slide along, the surface 56 and the lateral margins of the belts 50 overlap the lateral margins of the belts 60 inwardly of the throat.

The belts 60 may be of the composition as the belts 50 so that the water can be expelled therethrough and drain out to the lateral edges of the shoes 44 or spaces 48 therebetween and thereby be discharged. Thus, there is provided in the molding throat a continuous downwardly moving outer molding wall which is peripherally continuous and which is positively driven at a fixed rate of speed.

The mandrel 3 is lowered at the same rate of speed as the belt travel so that the molding operation is performed with all portions of the molding walls, both internal and external, maintaining a relatively fixed relation with respect to each other axially of the throat as they converge toward each other radially of the throat.

Below the forming throat, the suitable flying cutoff 6 is located. The cutoff 6 comprises a chain 64 arranged with the axis of its links vertical and carrying a plurality of cutting rolls 65. The chain is connected at one end to a frame 66, and at the other end is arranged for detachable connection to the frame by means of a pin 67. The frame 66 is connected to a worm 68 mounted in a body 69 and operable by a hand wheel 70. Cutting rolls 71 are connected in fixed position on the body 69 and engage the pipe at the side opposite from the rolls 65. By rotating the screw 68 with the chain 64 looped around the pipe, the cutters are pressed into engagement with the pipe. By swinging the body 69 about 60 degrees in each direction from its normal position, the pipe can be cut off. For this purpose, the cutter is mounted on a suitable swinging support 72 which can be swung to different positions about the axis of the pipe. The body 69 is supported on an upright post 73 which is telescopically mounted on an upright post 74 on the support 72, and a spring 75 is interposed between the posts so that the cutoff can be moved downwardly with the pipe during the cutting operation, so as not to interrupt the molding operation.

Below the cutting device 6 is the mandrel support and guide 7 which is essentially the same in form and function as the support and guide 2 heretofore described and which, accordingly, will not be described in detail except to point out that it has a supporting carriage 76 with a suitable upwardly exposed centering boss 77 which engages the interior of the lowest section 3a of the mandrel 3 and thus centers the lower end of the section and supports part of its weight.

The carriage 76 is movable downwardly along the guideway 10 at the same speed as, or at a greater rate of speed than, the downward feed movement of the mandrel 3 by the carriage 11, so that the carriages 11 and 76 cooperate to support, guide, and feed the mandrel and, after the pipe is cut, the pipe and lowest mandrel section may be rotated about their common axis to disconnect the lower mandrel section from the next section thereabove while supporting at least part of the weight of the disconnected section on the carriage 76. When disconnected, the lowest section 3a, still supported on the carriage 76, may be lowered promptly to remove the lower section 3a of the mandrel with the finished pipe thereon. The carriage 76 is connected to counterweights 78 by cables 79 passing over sheaves 80. The counterweights are operable to return the carriage 76 to a position just below the cutoff 6 where it can again engage the lower end of the next succeeding length of mandrel 3a. The carriage 76 is counterbalanced to such an extent it is always yieldably urged upwardly against the lower end of the lowest mandrel section 3a, and is moved downwardly under part of the weight of the mandrel and pipe. If desired, it also may be provided with a brake in the manner of the carriage 11.

Thus, except during the instant of adding a new section 3a at the upper end of the mandrel, at which time the mandrel is supported only by the guide and support 7, but not by the guide and support 2, and during the instant of removal of the lowest section 3a of the mandrel, at which time the upper operating sections of the mandrel are supported by the guide and support 2 and not by the guide 7, the mandrel as a whole is supported and guided at both ends.

If desired, suitable guide rolls may be provided at different positions along the length of the frame to assure the proper alignment of the mandrel in coaxial relation with the throat.

Referring next to Figs. 16–18, the mandrel, as mentioned, is in the form of a plurality of sections 3a. Each section preferably is in the form of a core 81 which may be a length of stainless steel tubing. At the upper end, the core is provided with a connector 82 which is in the form of a sabre connection having the usual sabre connection slots 82a and shoulders 83. At the lower end of the tube, on the inside, is secured a collar 84 having lugs 85 which are cooperable with a sabre connection such as that at the upper end of the section 3a. Thus, with a plurality of identical sections 3a, each can be detachably connected at its upper end to the lower end of a corresponding section, and detachably connected at its lower end to the upper end of a corresponding section. This is accomplished simply by inserting the connector 82 of a lower section into the lower end of the next upwardly adjacent section and turning one or the other of the sections a few degrees about their common axis, or by lowering the lower end of an upper section onto the connector 82 of a lower section and turning the same, an upper section 3a can be added to the mandrel 3. For example, to add an upper section, it is only necessary to take a section 3a and place its lower end on the topmost section which is held by the clamp 12 of the carriage 11, turn it a few degrees to complete the connection while the upper end of the mandrel is held by the clamp 12 and is being fed downwardly. Thereupon, the clamp 12 is released, the mandrel weight being supported on the carriage 76. The carriage 11, with the clamp 12, is returned to its uppermost position, whereupon the clamp is tightened on the added uppermost section and control of feed is again taken over by operation of the brake 17.

At the lower end, it is only necessary to turn the lower section 3a of the mandrel a few degrees for disconnecting it from the section thereabove, whereupon it is lowered away from the section thereabove while resting on the guide and support 7, after which it is promptly removed with the pipe formed thereabout from the guide 7 and the guide lifted to engage the lower end of the section which was immediately the one removed.

It is to be noted that the clamp 12 engages the mandrel sections 3a at a location below the connector head 82 so that that connector is readily accessible at all times for connection to a superposed section 3a of mandrel 3, while the one immediately therebelow is guided and supported for feeding by the carriage 11.

The outer surfaces of the mandrel are preferably made of glass fiber impregnated with a plastic composition, for example, with a polyester or vinylidene. The composition is applied in two coats totalling from about a quarter to five-sixteenths inch in thickness. After the setting and curing of the plastic, the surface is ground and polished, thus providing a surface which does not adhere to, but separates easily from, the pipe. Its resistance to removal from the pipe after the pipe is cured sufficiently for removal of the mandrel therefrom is quite low. Furthermore, this material is resilient and does not become scratched easily, and it resists deterioration by the liquids employed.

After a number of the sections of the mandrel 3a are separated, they are removed from the pipes and returned by suitable cable hoists, or in any desired manner, to the top of the frame for reuse. The number of mandrel sections required is, of course, dependent upon the rate of drying and the time during which the mandrel must remain in the finished pipe, which is usually a matter of about one and one half minutes.

Thus, with the structure described, a molding apparatus is provided which has a molding throat formed of a plurality of traveling mold surfaces which move continuously downwardly and converge concurrently toward a common axis of the pipe to be formed; a mandrel is disposed within the throat formed by the surfaces, and travels downwardly at substantially the same downward rate of travel as the operating surfaces of the surfaces; slush of the asbestos fiber material, or such material as is used in forming the pipe, is fed from a hopper continuously into the space between the mandrel and the mold surfaces; the molding surface is substantially continuous both endwise of the molding throat and circumferentially thereof; the structure may be operated continuously; and the molding surfaces travel at a relatively slow rate of speed to permit the adjustment of the fibers in the location to which moved during the forming and expressing of a greater portion of the water contained in the slush. By making the molding throat longer, the surfaces can be caused to travel at a greater rate of speed and thus increase the rate of production.

Having thus described my invention, I claim:

1. A molding apparatus comprising a plurality of mold devices, having travelling operating surfaces, respectively, elongated in the direction of travel, means supporting the devices with the surfaces arranged about a common axis and defining an elongated molding throat, and so that they can be driven to cause lineal travel of the surfaces concurrently at substantially the same speed as each other from an upper feeding location downwardly in a direction endwise of the throat to a lower discharge location and concurrently at substantially the same speed as each other in a direction toward said common axis, progressively and gradually, as the surfaces travel lineally from the feed location toward the discharge location, power means to drive the devices, supporting means to support a mandrel in said throat for axial movement in coaxial and radially spaced relation to said surfaces and defining with the surfaces an elongated annular molding space for receiving material to be molded, means to cause the supporting means to feed the supported mandrel axially in a direction from the feeding location toward the discharge location at approximately the same speed of lineal travel as that of said surfaces, means to feed a slush of fibrous material into the throat between said surfaces and mandrel at the feeding location, said surfaces of the devices being, respectively, of fixed dimension circumferentially of the common axis and spaced apart circumferentially, spacers having walls, respectively, facing the common axis and substantially filling the spaces between the circumferential limits of said operating surfaces, respectively, said wall surfaces of the spacers being both decresent in circumferential extent and convergent relative to each other, and toward the common axis, progressively, from the feeding location to the discharge location, whereby an approximately cylindrical exterior molding surface is provided at the lower end of the throat.

2. The structure according to claim 1 wherein each device includes a porous, flexible element overlying, in firm contact, the operating surface of the device, means supporting the element for movement endwise with the operating surfaces which it overlies, and said device having drain passages for receiving liquid pressed through the element from the throat and for conducting away the received liquid.

3. The structure according to claim 1 and further including porous flexible elements overlying the operating surfaces, respectively, of each of the devices, means supporting the elements for movement endwise with the operating surfaces, respectively, auxiliary flexible elements, means supporting the auxiliary elements in an overlying relation to said wall surfaces of the spacers, respectively, and movable therealong.

4. The structure according to claim 3 and further including power means to drive the auxiliary flexible elements endwise at substantially the same rate of travel as said flexible elements.

5. The structure according to claim 3 wherein said auxiliary flexible elements are porous.

6. The structure according to claim 3 wherein said flexible elements and said auxiliary flexible elements overlap each other at their adjacent margins.

References Cited in the file of this patent

UNITED STATES PATENTS

| | | |
|---|---|---|
| 1,249,088 | Hodge et al. | Dec. 4, 1917 |
| 1,359,489 | Claussen | Nov. 3, 1920 |
| 2,583,024 | Strobel | Jan. 22, 1952 |
| 2,773,287 | Stout | Dec. 11, 1956 |
| 2,796,810 | Muller | June 25, 1957 |
| 2,873,226 | Davies et al. | Feb. 10, 1959 |
| 2,884,062 | Taylor | Apr. 18, 1959 |